United States Patent Office 3,525,552
Patented Aug. 25, 1970

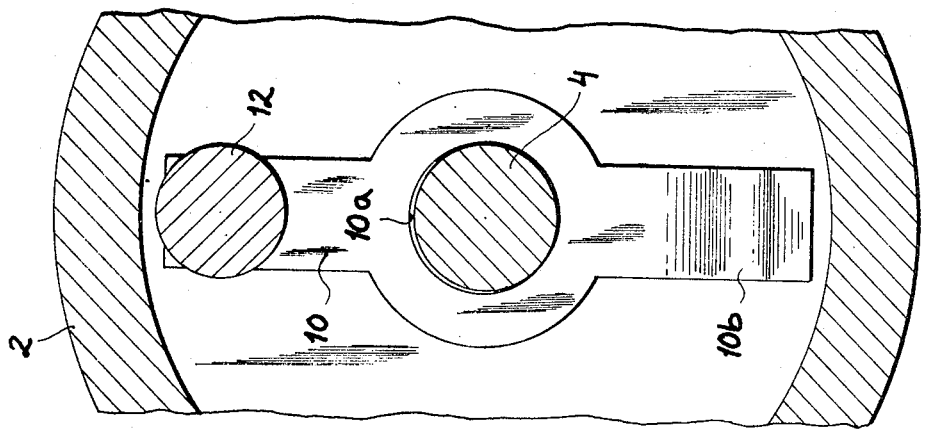
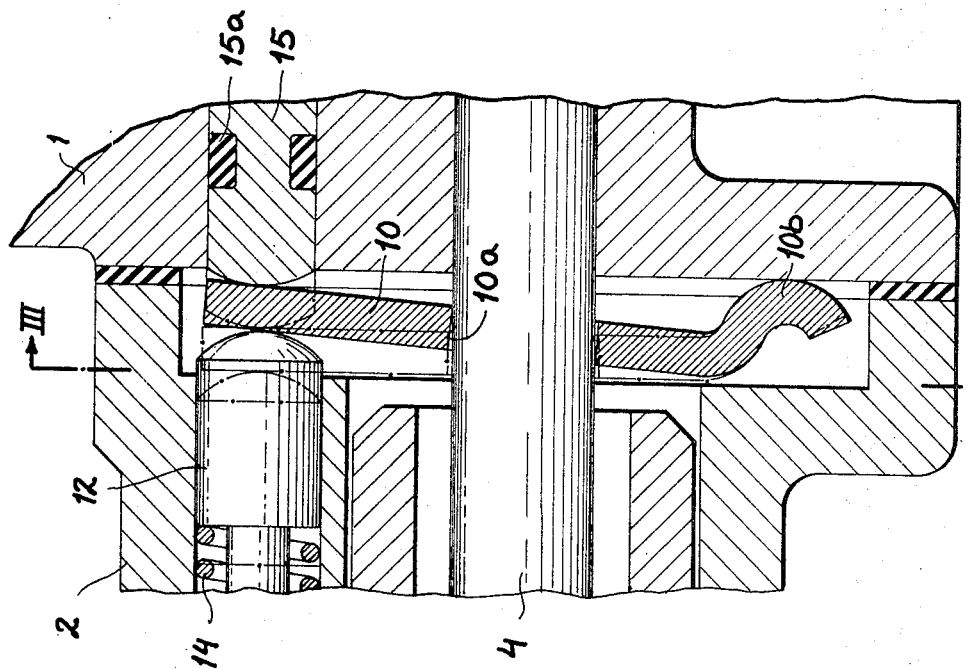

3,525,552
BRAKING-FORCE REGULATOR SYSTEM WITH CUTOUT
Heinrich Oberthur, Offenbach-Rumpenheim, Germany, assignor to Alfred Teves G.m.b.H., Frankfurt am Main, Germany, a corporation of Germany
Filed Sept. 6, 1968, Ser. No. 758,023
Claims priority, application Germany, Sept. 21, 1967, T 34,841
Int. Cl. B60t 8/26, 17/18
U.S. Cl. 303—6                  9 Claims

ABSTRACT OF THE DISCLOSURE

A braking-force regulator for a dual network system has a cutout device which responds to pressure in the front-wheel brake network to render ineffective the braking-force regulator connected in the rear-wheel brake network, thereby ensuring full braking in the rear wheels in case of failure in the front brakes. This cutout is a lever biased into locking engagement with the regulator piston rod and movable out of locking engagement therewith by a piston actuated by the fluid pressure in the front brake network.

---

Figure 1:
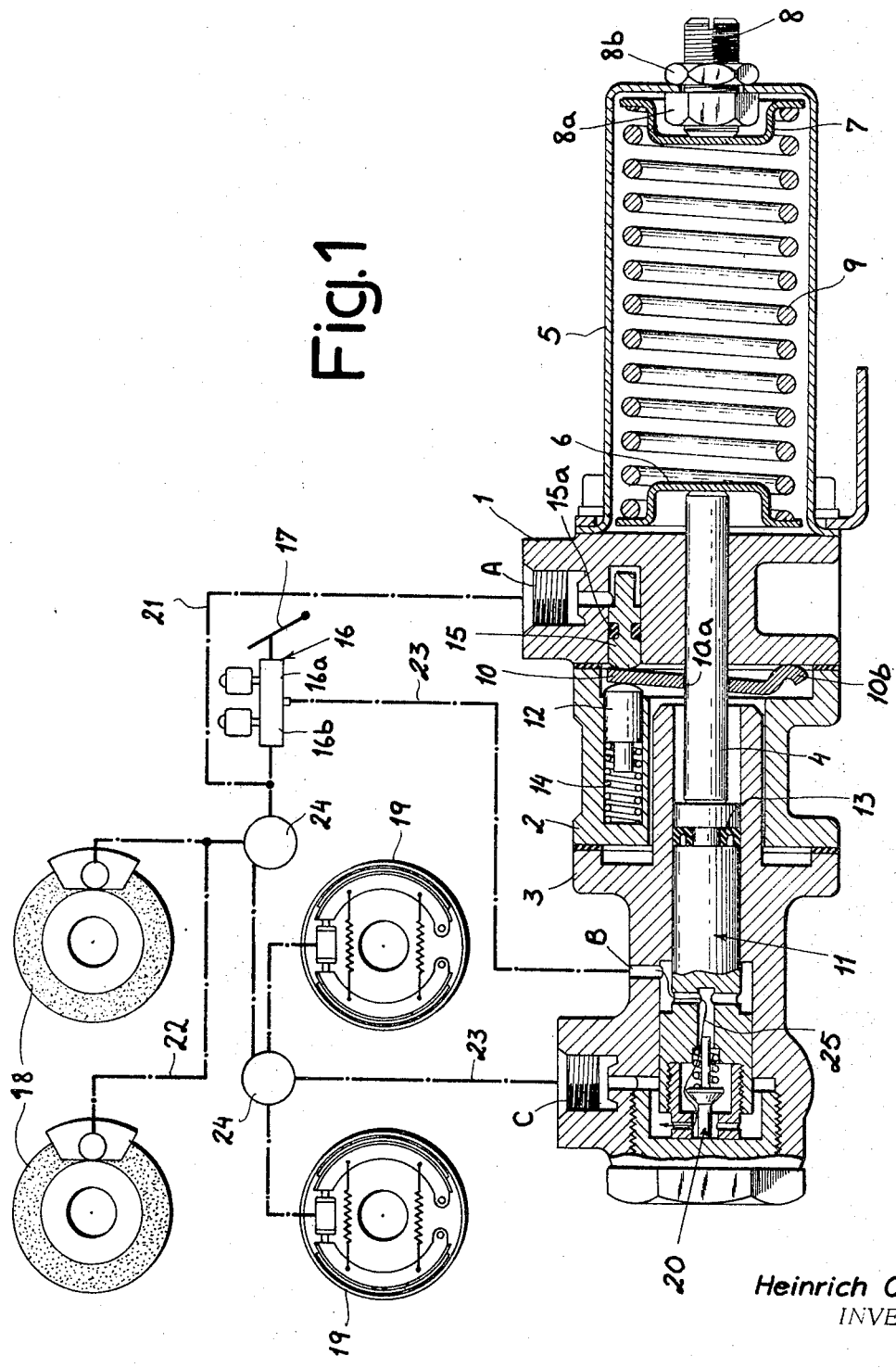

My invention relates to a braking-force regulator with a cutout device for a dual-network brake system.

Brake regulators for motor vehicles have been provided heretofore especially for large vehicles carrying a load over the rear axle to prevent the back wheels from locking during heavy braking. Should they lock, a heavily loaded vehicle is liable to go into an extremely dangerous, uncontrollable skid often at an angle (e.g. "fish tailing"). Such regulators have been discussed and described in my U.S. patents Nos. 3,169,800 and 3,233,947 and the co-pending applications Ser. No. 652,475 filed July 11, 1967 (now U.S. Pat. 3,459,000), Ser. No. 668,517 filed Sept. 18, 1967 (now U.S. Pat. 3,456,443) and Ser. No. 674,479 filed Oct. 11, 1967 (now U.S. Pat. 3,442,557).

However, with the increasing use of dual-network brake systems, certain new problems have come to the fore. Not the least of these problems is that, in a dual-network brake system wherein the front wheels are in one brake network and the rear wheels in another, failure of the front-wheel brake network in combination with a regulator on the rear wheels could lead to a dangerous condition. That is, with no front wheel braking possible and only limited braking due to the regulator in the rear-wheel network, the driver could find himself in a situation where he could not safely bring his vehicle to a halt.

It is therefore the object of my invention to provide an improved hydraulic dual-network brake system capable of avoiding this disadvantage.

According to the main feature of my invention this is done by providing the rear-wheel braking-force regulator with a cutout which is actuated on pressure loss in the front brakes to render the regulator ineffective, thereby permitting direct braking of the rear wheels.

This cutout has the form of a lever which engages a rod connected to or entrained with a piston of the regulator. As long as there is pressure above a predetermined level in the front-wheel brakes, a cylinder-and-piston arrangement prevents this lever from engaging and locking the shaft which locking blocks the piston and renders the regulator ineffective.

In case of vehicles such as earth movers which often change direction but which, due to their size, could also benefit from my invention, a simple sort of double-pole double-throw hydraulic valve can be provided in the brake system to shift the regulator such that it is always connected in the rear set of brakes regardless of the direction of operation.

These and other features and objects of my invention will be described in the following with reference to the drawing in which:

FIG. 1 is a schematic diagram of a dual-network brake system equipped with a braking-force regulator and cutout (shown in longitudinal section) according to my invention, FIG. 2 is a detail of FIG. 1 of my cutout in enlarged scale, and FIG. 3 is a cross-sectional view along the line III—III of FIG. 2.

A master cylinder 16 connected to a brake pedal 17 has two compartments 16b and 16a connected respectively to front brakes 18 and rear brakes 19 through brake lines 22 and 23, respectively forming the two brake networks. Interposed in the line 23 is a braking-force regulator in a housing 3 as shown and described in my U.S. Pat. No. 3,329,471 entilted "Braking-Force-Regulator."

This regulator has a differential piston 11 slidable in a bore in the housing 3. This piston 11 is urged to the left by a spring 9 spanned between spring seats 6 and 7 in a cage 5 and adjustable through setting of the set screw 8 screwed into a nut 8a in the end of the cage 5 and locked by a nut 8b. Gentle braking allows brake fluid to flow through the regulator in a port B and out a port C along the path indicated by an arrow 25. However, due to the fact that the piston 11, sealed with respect to its bore by a sealing ring 13, has a larger surface on its left-hand end than on its right-hand end, an increase in fluid pressure in the line 23 eventually forces this piston 11 to the right against the force of the spring 9 acting thereon via the rod 4. As this piston 11 moves to the right a check valve 2o is actuated which ultimately shuts off the conduit 23 only permitting force transmission through the piston 11. This force transmission is of course limited due to the above-mentioned difference in surface areas so that, with proper adjustment of the tension of the spring 9 via the set screw 8 a load-actuated lever arrangement connected to the rear axle such as discussed in my abovementioned patent, the rear brakes 19 will not lock.

Between the cage 5 and the regulator housing 3 are sandwiched two housings 2 and 1 of the cutout according to my invention. This cutout comprises basically a lever 10 formed with a fulcrum foot 10B and a bore 10a surrounding the shaft 4. The bore 10a is only slightly larger than the rod 4 which passes therethrough. A small piston 15 sealed with a ring 15a is actuable by fluid pressure in the front network via a feedback line 21 connected to a port A. Opposite this piston 15 is a second piston 12 biased into engagement with the lever 10 by a compression spring 14.

In this manner when, as shown in FIG. 1, there is little or no pressure in the front brake network the lever 10 is canted so that the edges of the bore 10a lockingly engage the surface of the rod 4 preventing it from moving to the right in FIG. 1.

Under normal conditions, with brake pressure in the front network, the lever 10 assumes the position by dot-dash lines shown in FIG. 2 and allows the rod 4 to move through the bore 10a with no hindrance. Thus, on failure of the front brake network or a drop in pressure therein so that the hydraulic force behind the piston 15 is not greater than that of the spring 14, the shaft is prevented from traveling to the right whereby the piston 11 remains to the left, thereby allowing full braking in the rear brakes 19.

In the case of an earth mover which is often required to reverse direction, for example a reversing valve 24 (e.g., a three-way valve as described in pages 176–180 of Fluid Power, U.S. Government Printing Office, Washington, D.C., 1966) is provided in front of the brakes 18 and 19 to reverse their relationship so that, relative to the direction of travel, the rear brakes always are connected to the regulator regardless of the direction of travel.

The improvement described and illustrated is believed to admit of many modifications within the ability of persons skilled in the art, all such modifications being considered within the spirit and scope of the invention except as limited by the appended claims.

I claim:
1. A dual-network hydraulic brake system for a motor vehicle having a front and a rear wheel, said system comprising:
   a first and a second wheel brake;
   a first and a second brake network hydraulically connected to said first and second wheel brakes, respectively, for pressurizing same;
   a braking-force regulator in said second network including control means responsive to fluid pressure in said second network for controlling fluid flow in same;
   cutout means responsive to fluid pressure in said first network for rendering said control means ineffective when said fluid pressure is below a predetermined limit, said first network and said first wheel brake being associated with said front wheel and said second network and said second wheel brake being associated with said rear wheel; and
   a master cylinder having two fluid compartments, each of said compartments being hydraulically connected to a respective one of said brake networks, said control means comprising a differential piston and a valve operable upon movement of said piston to permit direct flow of fluid in said second network in one position of said valve and to effect force transmission across said piston between fluid acting on opposite sides thereof in another position of said valve, said regulator further comprising a rod engageable with said piston, said cutout means comprising a cylinder-and-piston arrangement connected to said first network for actuation thereby and a lever engageable with said arrangement and lockingly engaging said rod for arresting same, said lever having a first position wherein it arrests said rod and a second position wherein it allows free movement of said rod on actuation of said cylinder-and-piston arrangement, said first position corresponding to said other position and said second position corresponding to said one position.

2. The system defined in claim 1 wherein said cutout means is actuable to lock said valve in said one position on a condition of said fluid pressure being below said predetermined level.

3. The system defined in claim 1 wherein said cutout means further comprises a first spring biasing said lever out of locking engagement with said shaft and into engagement with said cylinder-and-piston arrangement.

4. The system defined in claim 3 wherein said first spring is engageable with said lever directly opposite said cylinder-and-piston arrangement.

5. The system defined in claim 4, further comprising a cage, a second spring received in said cage, a cutout housing receiving said cutout means, and a regulator housing receiving said braking force regulator, said cutout housing being interposed between said cage and said regulator housing, said rod passing through said cutout housing and being biased by said second spring toward said one position.

6. The system defined in claim 5 wherein said lever is formed with a hole slightly larger than the diameter of said rod, said lever being cantable to lockingly engage said rod.

7. The system defined in claim 1 further comprising means for disconnecting said first and second networks from said front and rear wheel brakes respectively and for connecting said first and second networks to said rear and front wheel brakes, respectively.

8. A dual-network automotive-vehicle brake system, comprising:
   a set of fluid-operated vehicle front-wheel brakes and a set of fluid-operated vehicle rear-wheel brakes;
   respective fluid networks connected with said sets of brakes;
   master-cylinder means connected with said networks for individually pressurizing same to operate said sets of front-wheel brakes and rear-wheel brakes;
   a braking-force regulator connected between said master-cylinder means and said rear-wheel brakes in the network connected therewith for regulating the pressure transmitted to said rear-wheel brakes upon a change in the pressure delivered by said master-cylinder means, said braking-force regulator including:
      a valve connected in the network of said rear-wheel brakes and including a valve plunger displaceable in accordance with the pressure differential across said regulator,
      locking means co-operating with said plunger and effective to immobilize same, and a fluid-responsive piston independent of the plunger and effective to operate said locking means to release said plunger; and
      means for applying fluid pressure of said network connected to said front-wheel brakes to said piston for releasing said locking means upon the pressure in the network connected to said front-wheel brakes exceeding a predetermined level.

9. The brake system defined in claim 8 wherein said locking means includes a locking lever engaging said plunger and a spring-loaded pin bearing upon said lever and urging same into locking position, said fluid-responsive piston bearing upon said lever opposite said pin.

References Cited
UNITED STATES PATENTS

| | | | |
|---|---|---|---|
| 3,232,057 | 2/1966 | Kersting | 303—6 X |
| 3,441,318 | 4/1969 | Bueler | 303—6 |
| 3,448,230 | 6/1969 | Bueler | 303—6 X |

MILTON BUCHLER, Primary Examiner

J. J. McLAUGHLIN Jr., Assistant Examiner

U.S. Cl. X.R.

60—54.5; 188—151, 152; 303—84